June 10, 1952  R. G. LOCKETT  2,600,059
TWO WIRE LOAD MEASURING SYSTEM
Filed Jan. 28, 1948
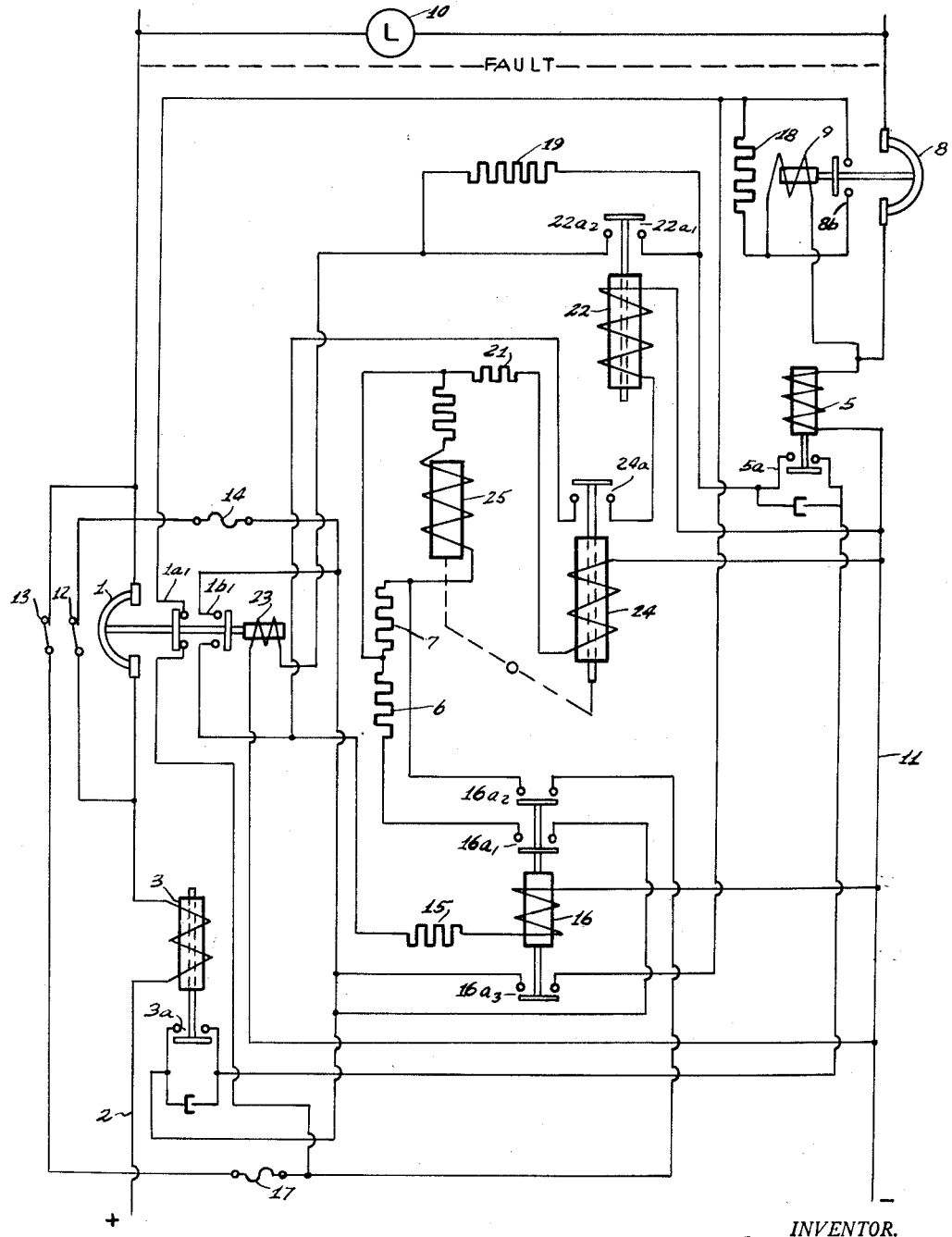
INVENTOR.
RALPH G. LOCKETT
BY Ostrolenk & Faber
ATTORNEYS Patented June 10, 1952

2,600,059

UNITED STATES PATENT OFFICE 2,600,059

TWO WIRE LOAD MEASURING SYSTEM

Ralph G. Lockett, Narbeth, Pa., assignor to ITE Circuit Breaker Company, Philadelphia, Pa., a corporation of Pennsylvania Application January 28, 1948, Serial No. 4,833

2 Claims. (Cl. 175—294)

My invention relates to a novel two wire load measuring system for direct current circuit, and more particularly relates to load measuring systems for use in ungrounded systems.

In many industrial systems, the return circuit for the trolley is usually preferably ungrounded. When a fault occurs it has heretofore been the practice to close a measuring resistance circuit across the terminals of the open circuited circuit breaker by which the extent of the fault is measured. If the fault has automatically cleared itself, the circuit breaker is automatically reclosed.

Opening the positive side by a single pole breaker, however, leaves the negative or ungrounded side still with a high and dangerous potential. For example, an operator may have accidentally thrown some tool, such as a wrench, across the trolley and return circuit. In order to assist such an operator in clearing himself from contact with such a fault, it is desirable that both the return and the trolley circuit be opened. That is to say, it is often essential that both sides of such a system be opened in response to a fault. After a predetermined interval of time the return circuit should be reclosed for the purpose of measuring the extent of the fault in order to control the reclosing of the circuit.

Accordingly an object of my invention is to provide a novel circuit arrangement whereby both sides of an ungrounded circuit are momentarily opened following a fault.

A further object of my invention is to provide a novel circuit arrangement for measuring the extent of a fault.

Still another object of my invention is to provide a novel circuit arrangement for two single pole circuit breakers in which both the trolley and the return circuit are opened in response to faults.

These and other objects of my invention will be more clearly apparent in the detailed description of the invention which is to follow in connection with the accompanying drawing which schematically shows one circuit arrangement for carrying out my invention.

Referring now to the drawing, the circuit breaker 1 of the type illustrated in Patent No. 1,695,506, is connected in the conductor 2 and provided with fault current responsive magnet 3. In the event of a fault as indicated at the dotted line, the circuit breaker 1 is automatically operated to disconnect its contacts and open the circuit of the conductor 2 from the source of power.

Resistors 6 and 7 are thereupon connected in circuit across the contacts of the circuit breaker 1 in a manner to be described hereinafter, and measure the fault. Should the fault have cleared itself, the circuit breaker 1 is reclosed. The operations for the above are well known in the art and will be briefly described in connection with my novel addition thereto.

In accordance with the present invention, a circuit interrupter 8 is connected in the return circuit 11 and provided with a closing magnet 9. In the event of a double fault to ground circuit interrupter 8 is provided with a fault current responsive magnet 5, which will cause the circuit interruptor 8 to open and disconnect the return conductor 11 from the source of power. The circuit arrangement as will be described hereinafter is such that upon the interruption of the circuit breaker 1, the circuit interruptor 8 is momentarily opened; thus by reason of the disconnection of both the circuit breaker 1 and circuit breaker 8 both the conductor 2 and the return circuit 11 are opened.

After an interval of time, as will be described hereinafter, the circuit interruptor 8 is reclosed and the resistors 6 and 7 are then in circuit for measuring the fault to determine whether the circuit breaker 1 is to reclose.

The above operations will now be described in detail. Normally with the circuit breaker 1 and the circuit breaker 8 closed, the circuit extends over the conductor 2 and through the fault responsive relay 3, circuit through the contacts of circuit breaker 1 and through load 10 over the contacts of the circuit breaker 8 through the current responsive relay 5 and over the return circuit 11 to the source.

It will be assumed that a fault current energizes the relay 3 to effect interruption of the circuit breaker contacts 1. With the circuit breaker closed, an energizing circuit was completed for the holding winding 9 of the circuit breaker 8, the circuit extending from the source and through the circuit breaker 1 over contact 13 through the fuse 17 over contact 1a1, an auxiliary contact on the circuit breaker which is closed when the circuit breaker is closed and which opens when the circuit breaker opens, through the resistor 18 and the holding magnet winding 9 to the return circuit 11. Upon the opening of the circuit breaker 1, contact 1a1 opens, thus opening the energizing circuit for the closing magnet 9 of the circuit breaker 8 and the circuit breaker 8 thereupon opens.

The contact 1b1, which is an auxiliary contact on the circuit breaker 1 is open while the circuit breaker 1 is closed and is closed by the opening of the circuit breaker 1, and a circuit is now completed from the source over the conductor 2, through the winding 3 over the contacts 12 and fuse 14, through the contact 1b1 over the resistor 15 through the winding 16 to the return circuit 11.

The contact 1b1 is also an auxiliary contact which has a time delay attachment thereto for delaying its closing for an interval of time after the circuit breaker 1 has opened. Accordingly this circuit will not be closed for a predetermined interval of time after the circuit breaker 1 has opened and during this interval the circuit breaker 8 stays open.

After this predetermined interval, however, the energizing circuit for the winding 16 is completed and this relay 16 is energized to close its contacts 16a1 and 16a2. The relay 16 is provided with a special set of contacts 16a3 which are also closed upon the energization of the relay 16. Closing of the contacts 16a3 now completes an energizing circuit from the conductor 2 over the contacts 16a3 and through the closed contact 8b, which is closed while the closing magnet 9 is deenergized, and through the winding 9 to the return circuit 11.

Energization of the closing magnet 9 will now reclose the circuit breaker 8. Upon its closing, contact 8b opens, but the circuit now continues through the current reducing resistor 18 to hold this winding 9 energized. With the circuit breaker 8 thus reclosed, the circuit is in condition for measuring the fault. This measuring circuit now extends from the conductor 2 and over the contacts 12 and 16a1 through resistors 6 and 7 through contact 16a2 and contact 13 through the fault to circuit interruptor 8 and current responsive relay 5 on conductor 11 to the source.

The mid-point between resistors 6 and 7 is connected through resistor 21 to the load measuring closing coil 24.

If, as is well known in the art now, the fault has cleared itself when the above described circuit is completed, sufficient current from the source will flow through the winding of the load measuring coil 24 to energize this relay. Load measuring relay 24 comprises the winding 24 and the holding coil 25, as described in Patent No. 1,498,695.

Upon energization of the winding 24, its associated armature is operated to close its contact 24a and an obvious energizing circuit is now completed for the closing control relay 22. Energization of relay 22 closes its contacts 22a1 and 22a2 and an obvious energizing circuit is now completed through the contact 3a on the de-energized trip coil 3 and through contacts 22a1 and 22a2, and through the winding of the circuit breaker closing coil 23.

Energization of the circuit breaker closing coil 23 will operate the circuit breaker 1 to reclose in a manner now well known in the art. Upon reclosing of the circuit breaker 1, contact 1b1 will open, effecting a de-energization of the resistor control relay 16 and its contacts 16a1, 16a2 and 16a3 will open, thus resulting in the de-energization of both the closing and holding windings 24 and 25, respectively.

The opening of contact 1b1 also opens the energizing circuit for the closing coil control relay 22 which in turn opens the 22a1 and 22a2. Upon the opening of these contacts the circuit continues through the current reducing resistor 19 to hold the winding 23 energized.

As will now be clear, in accordance with the novel circuit herein described, the circuit breaker 1 is opened on a fault which in turn causes the opening of the circuit interruptor 8, thus opening both the conductor 2 and the return circuit 11. After an interval of time, the circuit interrupter 8 is reclosed and if the fault has in the interim corrected itself, the load measuring relay coils 24 and 25 will function through the closing coil 23 to effect a reclosing of the circuit breaker 1.

In the foregoing I have described my invention solely in connection with specific illustrative embodiments thereof. Since many variations and modifications of my invention will now be obvious to those skilled in the art, I prefer to be bound not by the specific disclosures herein contained, but only by the appended claims.

I claim:

1. In an ungrounded direct current system having a first conductor and a return conductor, and load measuring relays and resistors; a first reclosing circuit breaker having engaging contacts connected in series in said first conductor an auxiliary contact on said circuit breaker closed when said first circuit breaker is closed and open when said first circuit breaker is open, a first reclosing magnet for said first circuit breaker operative when energized for reclosing and holding closed said contacts of said first circuit breaker, and operative when deenergized for effecting disengagement of said contacts of said first circuit breaker, a first trip magnet means for said first circuit breaker responsive to a fault current in said first circuit breaker to effect deenergization of said first reclosing magnet; a second reclosing circuit breaker having engaging contacts connected in series in said return conductor, a second reclosing magnet for said second circuit breaker operative, when energized, for reclosing and holding closed said contacts of said second circuit breaker and operative when deenergized, for effecting disengagement of said contacts of said second circuit breaker said auxiliary contact providing an energizing circuit for said second reclosing magnet when said first circuit breaker is closed and opening said energizing circuit when said first circuit breaker is opened, a second trip magnet, said second trip magnet being connected in series in said return conductor and including means responsive to a fault current in said second circuit breaker for opening the energizing circuit of said first reclosing magnet to effect de-energization of said first reclosing magnet, a relay, a time delay contact on said first circuit breaker which closes an energizing circuit for said relay a predetermined time after said first circuit breaker opens, circuit means controlled by said energized relay for completing a second energizing circuit for said second reclosing magnet, circuit connections including said load measuring resistors and relays operative following the closing of said second circuit breaker for testing the fault condition of said direct current system while said first circuit breaker is in the contact disengaged position and relay means operative in the event said fault on test is found to have been cleared for energizing said first reclosing magnet to reclose said first circuit breaker; said first and second circuit breakers providing isolation for line to line and double line to ground faults.

2. In an ungrounded direct current system having a first conductor and a return conductor, and load measuring relays and resistors; a first reclosing circuit breaker having engaging contacts connected in series in said first conductor, a first reclosing magnet for said first circuit breaker for effecting, when energized, reclosing and holding closed said contacts of said first circuit breaker and for effecting when de-energized, disengagement of said contacts of said first circuit breaker, a first trip magnet connected in series in said first conductor for said first circuit breaker responsive to a fault current in said first circuit breaker to effect de-energization of said first reclosing magnet; a second reclosing circuit breaker having engaging contacts connected in series in said return conductor, a second reclosing magnet for said second circuit breaker for effecting, when energized, reclosing and holding closed said contacts of said second circuit breaker and for effecting when de-energized, disengagement of said contacts of said second circuit breaker, a second trip magnet, contacts of said second trip magnet being in series with the said contacts of said first trip magnet, said second trip magnet connected in series in said return conductor and responsive to a fault current in said second circuit breaker to effect de-energization of said first reclosing magnet, a relay, a time delay contact on said first circuit breaker which closes the energizing circuit for said relay a predetermined time after said first circuit breaker opens, means including said load measuring resistors and relays for completing an energizing circuit for said first reclosing magnet when said load measuring resistor and relays indicates that the fault which caused disengagement of said first circuit breaker has been cleared; an auxiliary contact on said first circuit breaker for completing an energizing circuit for said second reclosing magnet, said auxiliary contact maintains said second circuit breaker in the circuit closed position when said first circuit breaker is closed and maintaining said second circuit breaker open when said first circuit breaker is opened, said relay when energized, completing an energizing circuit by-passing said auxiliary contact for said second reclosing magnet, and also completing the energizing circuit for the load measuring resistors and relays; said load measuring relays when energized, completing an energizing circuit for said first reclosing magnet, said first and second circuit breakers providing isolation for line to line and double line to ground faults.

RALPH G. LOCKETT.

REFERENCES CITED

The following references are of record in the file of this patent:

UNITED STATES PATENTS

| Number | Name | Date |
| --- | --- | --- |
| 1,498,695 | Ravey | June 24, 1924 |
| 1,505,633 | Finney | Aug. 19, 1924 |
| 1,632,983 | Proctor | June 21, 1927 |
| 1,669,516 | Golladay | May 15, 1928 |
| 1,695,506 | Ravey | Dec. 18, 1928 |
| 2,244,086 | Scott | June 3, 1941 |
| 2,249,870 | Taliaferro | July 22, 1941 |